June 5, 1962  S. PAZAN  3,037,207
FASTENING DEVICE
Filed April 6, 1960  5 Sheets-Sheet 1

INVENTOR.
SEYMOUR PAZAN
BY J. Walton Bader
ATTORNEY

INVENTOR.
SEYMOUR PAZAN
BY J. Walton Bader
ATTORNEY

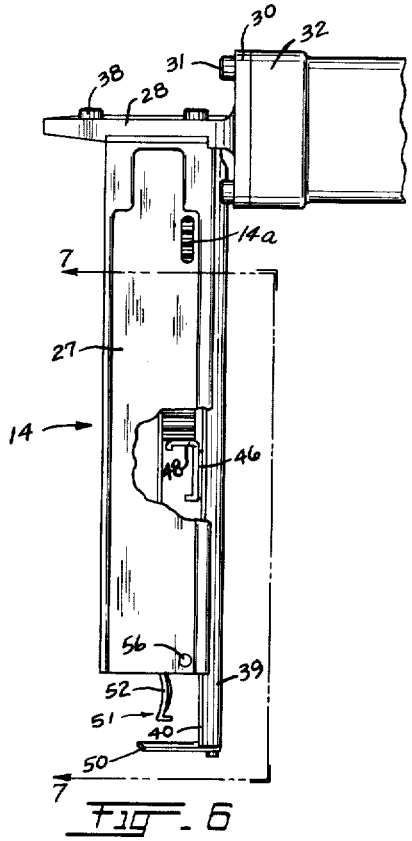
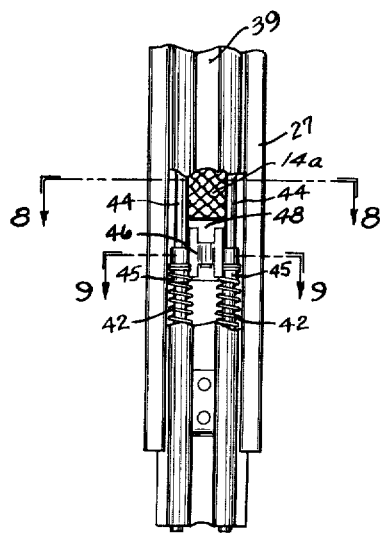
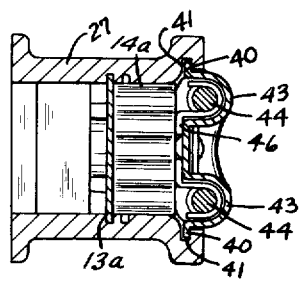
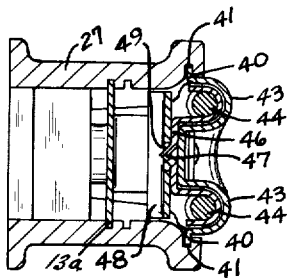

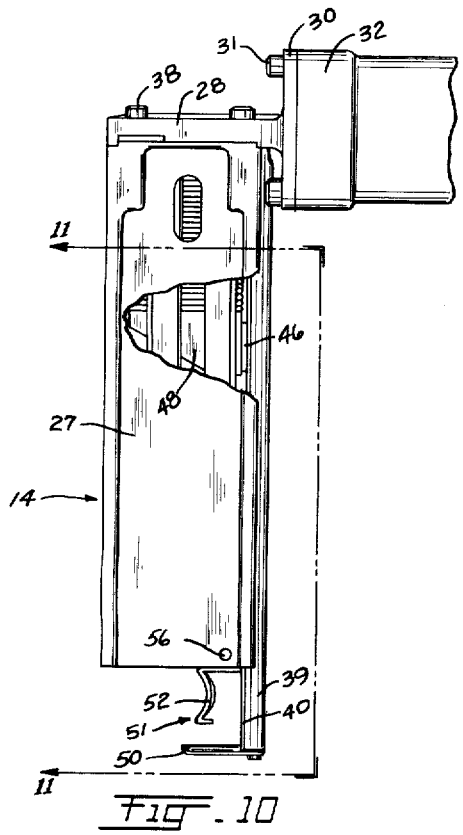
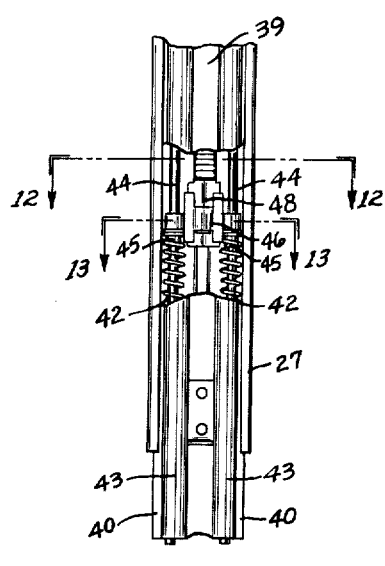
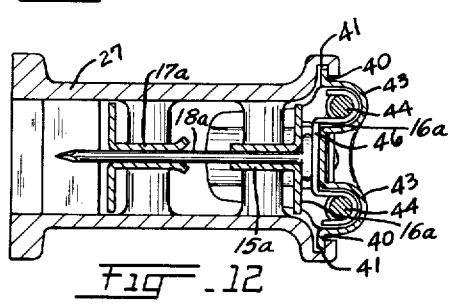
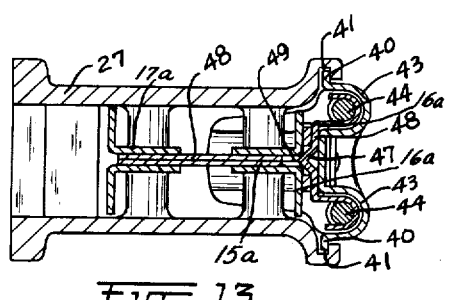

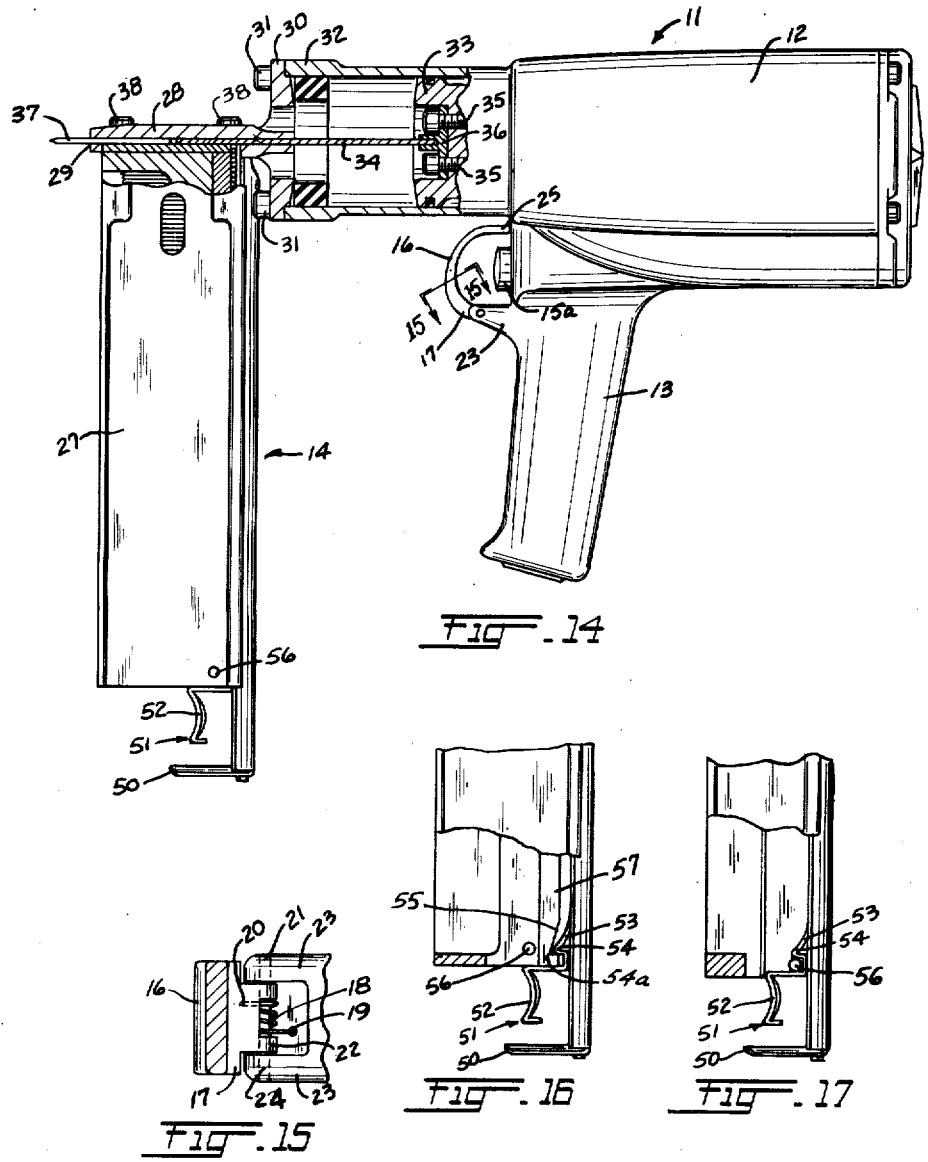

United States Patent Office 3,037,207
Patented June 5, 1962

3,037,207
FASTENING DEVICE
Seymour Pazan, North Massapequa, N.Y., assignor to Swingline Industrial Corporation, Long Island City, N.Y., a corporation of New York
Filed Apr. 6, 1960, Ser. No. 20,471
11 Claims. (Cl. 1—44.4)

This invention relates to a fastening device and has particular application to fastening devices which are fluid (compressed gas) actuated and which are designed to drive staples, nails, tacks and the like into work to fasten materials together.

Fastening devices of the fluid actuated type are relatively expensive. Therefore, for economical operation, particularly when a number of different types of fasteners are to be driven into work at various times, it is preferable to have one device with interchangeable magazines rather than a number of separate devices. The principal cost of the fastening device lies in the actuating portions thereof and the magazine is relatively inexpensive.

The instant invention not only permits quick and simple interchangeability of magazines when different types of fasteners are to be driven by the same fastener driving device but, in addition, permits simple manufacture of the interchangeable magazines. Many of the parts of the magazine used in the fastening device of this invention are interchangeable between different types of magazines and, in addition, those parts which are not interchangeable can be easily substituted.

The invention herein (when applied to a fluid actuated fastening device) also includes guard means surrounding the trigger means of unusual type and, in addition, may include button type trigger means.

The invention also includes specific constructional features of the parts involved which are described in the specification and set forth in some of the appended claims.

Various other features and advantages of this invention will be apparent to the reader of this specification.

The instant invention may be briefly described as comprising a fastening device including a housing, fastener propelling means movable therewithin, and a magazine connected to the housing in operative relationship with the fastener propelling means.

Where the fastening device of this invention is fluid operated, the invention may optionally include guard means surrounding the trigger means and also, if desired, button type trigger means.

The magazine of this invention includes a casing, fastener support means within the casing, a follower operatively connected to the fastener support means, a cover overlying the casing, and spring means operatively connected to the follower.

The parts of this invention may also include the specific constructional features hereinafter set forth.

The invention will be further described by reference to the accompanying drawings which are made a part of this specification and represent the best modes presently known to the inventor to carry out the foregoing invention.

FIG. 1 is a side perspective view of the fastening device of this invention showing the arrangement of parts thereof.

FIG. 2 is a side view of one of the magazines and associated parts which may be used in this invention. The magazine shown is used to carry double prong staples. A portion of the magazine casing is broken away to show a part of the internal structure.

FIG. 6 is a side view of another type of magazine and associated parts that may be used in this invention. The magazine shown in this figure is used to carry corrugated fasteners. A portion of the magazine casing is broken away to show the internal structure.

FIG. 7 is a plan perspective view of the type of magazine shown in FIG. 6 including the area included between the phantom lines 7—7 of FIG. 6. Parts of the cover of the magazine are broken away to show the internal structure.

FIG. 8 is a sectional view of the magazine shown in FIG. 7 taken along lines 8—8 of FIG. 7.

FIG. 9 is a sectional view of the magazine shown in FIG. 7 taken along lines 9—9 of FIG. 7.

FIG. 10 is a side view of another type of magazine and associated parts which may be used in this invention. The magazine shown in this figure is used to carry T-nails. A portion of the magazine casing is broken away to show the internal structure.

FIG. 11 is a plan perspective view of the type of magazine shown in FIG. 10 including the area included between the phantom lines 11—11 of FIG. 10. Parts of the cover of the magazine are broken away to show the internal structure.

FIG. 12 is a sectional view of the magazine shown in FIG. 11 taken along lines 12—12 of FIG. 11.

FIG. 13 is a sectional view of the magazine shown in FIG. 11 taken along lines 13—13 of FIG. 11.

FIG. 14 is a side view of a fluid actuated fastening device of this invention used in conjunction with the type of magazine shown in FIGS. 1–5 with parts of the device broken away to show the internal structure.

FIG. 15 is a detail cross-sectional view of the trigger guard used in this invention taken along lines 15—15 of FIG. 14.

Figure 1:
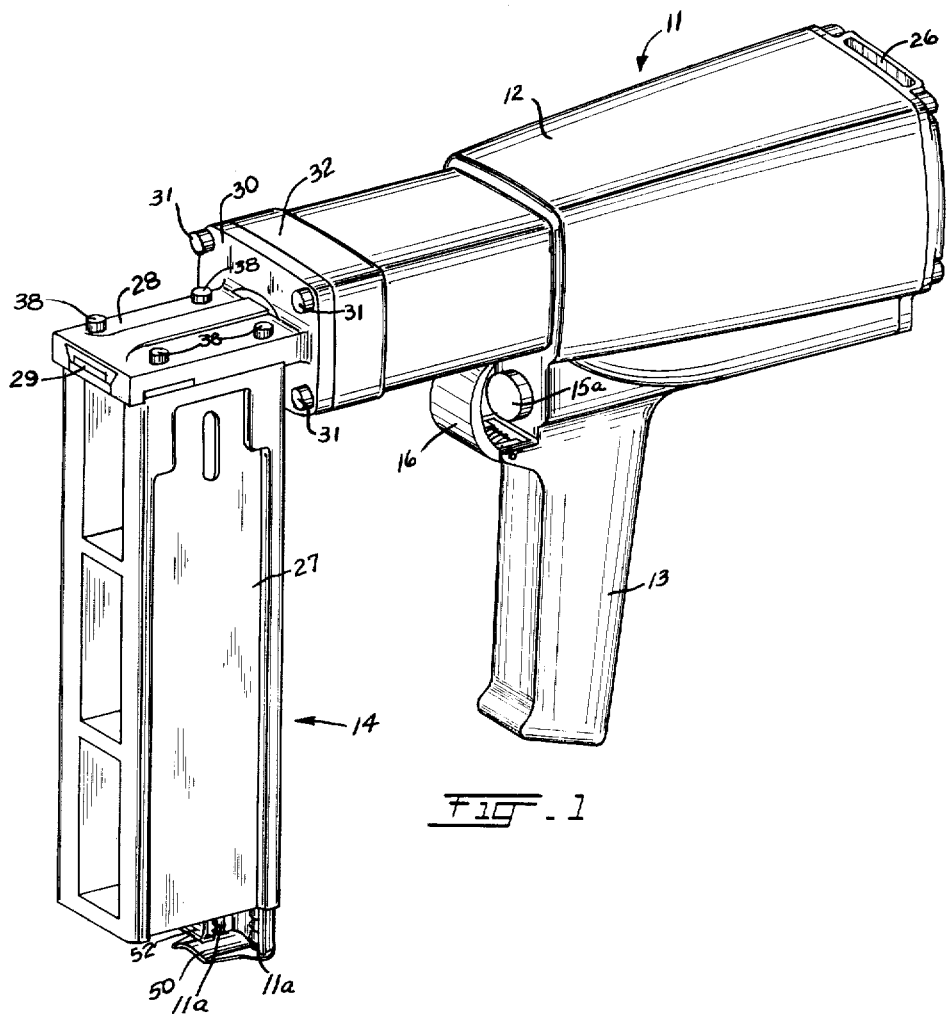
Figure 2:
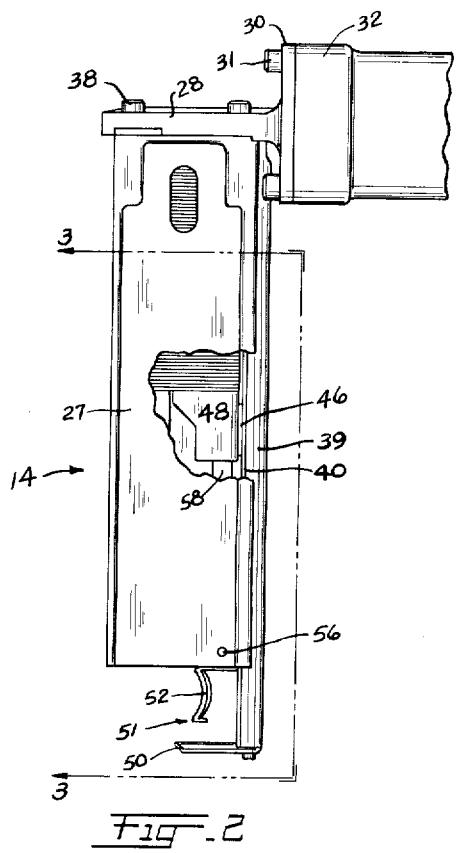
Figure 3:
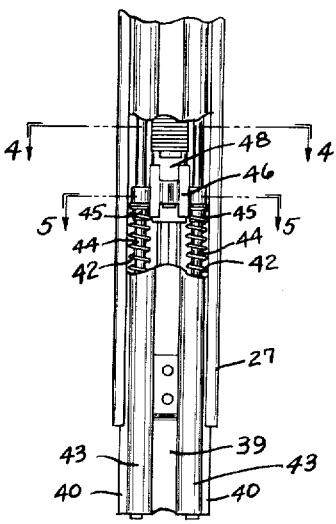
FIG. 3 is a plan perspective view of the type of magazine shown in FIG. 2 including the area included between the phantom lines 3—3 of FIG. 2. Parts of the cover of the magazine are broken away to show the internal structure.

FIG. 16 is a detail side view of the rear portion of the type of magazine shown in FIG. 2 with a portion of the casing broken away to show the latching means that may be employed to secure the cover upon the magazine.

FIG. 17 is a detail side view of the rear portion of the type of magazine shown in FIG. 6 showing an alternative type of latching means that may be employed.

Referring now to the drawings in detail for a further description of this invention the fastening device 11 is formed with a housing 12, a handle 13, and a magazine 14.

Since the fastening device shown is fluid operated an air input port (not shown) is provided within handle 13.

A trigger 15a (here shown of the button type) is provided adjacent handle 13 and an arcuate guard member 16 is spaced from trigger 15a and is secured to a holding portion 23 of the fastening device 11 at a first end portion 17 thereof. A tension spring 18 is secured to the holding portion 23 of fastening device 11 by means of hole 19 and to guard member 16 by end portion 20. A pin 21 is provided passing through a recess 22 within guard member 16 and a mating recess 24 within holding portion 23. The tension of spring 18 normally holds the second end portion 25 of guard member 16 in abutting relationship with fastening device 11 but permits portion 25 of guard member 16 to be swung away from fastening device 11.

An exhaust port 26 may also be provided where the fastening device of this invention is fluid operated.

The magazine 14 of this invention is slightly different in structure to accommodate various types of fasteners to be driven by the fastening device of this invention. However all variations of magazine 14 include casing 27, front plate 28, and channel 29. The fastening device is driven from magazine 14 through channel 29.

Front plate 28 carries upper portion 30 which is secured to lower portion 32 of housing 12 by screws 31.

Where fastening device 11 is of the fluid actuated type a piston 33 is provided and a driver blade 34 is secured to piston 33 by holding portion 36 which is brazed to driver blade 34. Extension 36 is secured to piston 33 by screws 35.

Driver blade 34 is adapted to extend into channel 29 and therefore can expel a fastener 37 through channel 29.

Upper portion 30 of front plate 28 is secured to casing 27 by screws 38.

Casing 27 is open at its upper end and bears cover 39 thereupon. Cover 39 is slidably movable along casing 27 by means of lateral flanges 40 of cover 39 which are slidably movable within recesses 41 in casing 27.

A pair of coil springs 42 are disposed along the underside of cover 39 which is formed with arcuate portions 43 to accommodate springs 42.

Coil springs 42 are disposed along spring support members 44 which also bear widened portions 45 which retain coil springs 42 upon spring support members 44. Spring support members 44 are secured at their rear portions 11a (FIG. 1) to handle portion 50 of cover 39. Springs 42 bear against handle portion 50 of cover 39 at their rear portions and against widened portions 45 of spring support members 44 at their front portions.

A follower actuating member 46 is disposed between springs 42 and is formed with an actuating portion 47 thereupon. A follower 48 is formed with an opening 49 within its upper portion with which portion 47 meshes.

A handle 50 is secured to cover 39 and a latch member 51 is also secured to cover 39. Latch member 51 bears a handle portion 52 and a springable body portion 53 having a detent 54 thereupon. Detent 54 is adapted to mesh with a mating detent which may be 55, of the type shown in FIG. 16, or 56 of the type shown in FIG. 17.

The pin 56 is also provided to prevent cover 39 from being completely removed from casing 27 in the normal operation of the fastening device of this invention. Pin 56 abuts follower 48 when cover 39 is in full open position and thus normally prevents removal of cover 39 from casing 27.

Where magazine 14 is utilized for holding double prong fasteners such as staples special structure is provided. This structure is shown in FIGS. 2, 3, 4, 5 and 16. A rail 57 is provided having an upper portion 58. The follower 48 is formed with a pair of downwardly depending portions 59 which straddle rail 57.

A cut-out portion 55a (FIG. 16) is provided at the rear of rail 57.

Where magazine 14 is utilized for holding corrugated fasteners such as the strip described in the United States patent application, Serial Number 850,384 filed November 2, 1959, then the structure shown in FIGS. 6, 7, 8, 9 and 17 is used. In this construction, since a rail similar to 57 is not used, the pin 56 is also used as the mating detent to hold cover 39 in place upon casing 27. Also, since corrugated fasteners do not have a horizontal crown portion a support 13a must be provided to support the strip of fasteners 14a.

Where magazine 14 is utilized to hold T-nails the structure shown in FIGS. 10–13 is provided. An upper guide channel 15a having an overhanging portion 16a is utilized. A lower guide channel 17a is also provided. Guide channels 15a and 18a guide the T-nails and the follower 48. The heads of the T-nails rest upon overhanging portion 16a.

The operation of this invention will now be explained utilizing the structure shown in FIGS. 1, 2, 3, 4, 5, 14, 15 and 16, where the fastening device of this invention utilizes double prong fasteners such as staples. The reader can understand, however, that the other variations of this invention will operate in a similar manner.

Figure 4:
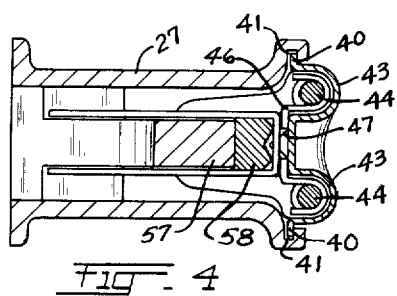
FIG. 4 is a sectional view of the magazine shown in FIG. 3 taken along lines 4—4 of FIG. 3.
Figure 5:
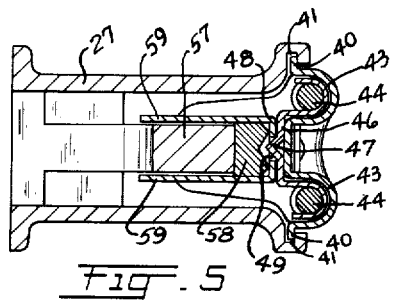
FIG. 5 is a sectional view of the magazine shown in FIG. 3 taken along lines 5—5 of FIG. 3.

The latch 51 is depressed and handle 50 pulled back so as to slide cover 39 back along casing 27 to its most rearward position until it is stopped by pin 56. Since coil springs 42 are not compressed at this time they will normally bear against the abutting portions of follower actuating member 46. Also, as previously described, follower actuating member 46 is connected to follower 48 through actuating portion 47. Coil springs 42 are also disposed upon the same spring support members 44 as are portions of follower actuating member 46 and members 44 are also secured to cover 39. Thus the rearward movement of cover 39 will move follower 48 rearwardly as well. Rail 57 is then exposed and staples 37 in strip form are placed upon rail 57 as shown in FIG. 4. Cover 39 is then moved forwardly which causes follower 48 to abut the rear of the staples 37 upon rail 57. Since follower 48 cannot move further forwardly the forward movement of cover 39 causes compression of coil springs 42 and thus spring loads follower 48. As cover 39 is moved to its most forward position detent 54 engages detent 55 and thus locks cover 39 into place.

The device is then used until all staples 37 are expelled from magazine 14 when the process is repeated.

The foregoing specific embodiments of this invention, as set forth in the specification herein, are for illustrative purposes and for purposes of example only. Various changes and modifications can obviously be made within the spirit and scope of this invention and would occur to those skilled in this art.

I claim:

1. In a fluid operated fastening device the improvement which comprises a substantially circular trigger button, a pivotally and downwardly movable arcuate guard member secured to said fastening device at a first end portion thereof and spaced from said trigger button, coil tension spring means secured to said first end portion of said guard member and to said fastening device, said tension spring means normally holding the second end portion of said guard member in abutting relationship with said fastening device but permitting said second end portion of said guard member to be swung way from said fastening device by application of force thereto and to return to its normal position when said force is removed therefrom.

2. A magazine for a fastening device comprising a casing, fastener support means and a follower within said casing, a slidably movable cover overlying said casing, a pair of spaced spring members connected to said cover, and a follower actuating member between said spring members operatively connected to said spring members and to said follower.

3. A magazine for a fastening device comprising a casing, fastener support means and a follower within said casing, a slidably movable cover overlying said casing, a pair of spaced spring support members upon said cover, a coil spring upon each of said spring support members, and a follower actuating member between said spring members operatively connected to said spring members and to said follower.

4. A magazine for a fastening device comprising a casing, fastener support means and a follower within said casing, a slidably movable cover overlying said casing, a pair of spaced spring support members upon said cover, a coil spring disposed upon each of said spring support members, a follower actuating member between said spring members operatively connected to said spring members and to said follower, and latching means upon said cover and complementary latching means upon said magazine.

5. A magazine for a fastening device comprising a casing having an open upper portion provided with a pair of spaced lateral cover retaining slots, fastener support means and a follower within said casing, a slidably movable cover overlying said casing and being disposable within said cover retaining slots, a pair of spaced spring support members upon said cover, a coil spring disposed upon each of said spring support members, a follower actuating member between said spring members operatively connected to said spring members and to said follower, latching means upon said cover and complementary latching means upon said magazine.

6. A magazine for a fastening device comprising a casing having an open upper portion provided with a pair of spaced lateral cover retaining slots, fastener support means within said casing, a follower engageable with said fastener support means and provided with an opening at its upper portion, a slidably movable cover overlying said casing and being disposable within said cover retaining slots, a pair of spaced spring support members upon the underside of said cover, a coil spring disposed upon each of said spring support members, a follower actuating member disposed between said spring members and operatively connected thereto, said follower actuating member having a projection disposable within the opening within said follower; latching means upon said cover, complementary latching means upon said magazine.

7. A magazine for a fastening device comprising a casing having an open upper portion provided with a pair of spaced lateral cover retaining slots, fastener support means within said casing, a follower engageable with said fastener support means and provided with an opening at its upper portion, a slidably movable cover overlying said casing and being disposable within said cover retaining slots, a handle upon said cover, a pair of spaced spring support members upon the underside of said cover, a coil spring disposed upon each of said spring support members, a follower actuating member disposed between said spring members and operatively connected thereto, said follower actuating member having a projection disposable within the opening in said follower, latching means upon said cover, and complementary latching means upon said magazine.

8. A magazine for a fastening device comprising a casing having an open upper portion provided with a pair of spaced lateral cover retaining slots, a rail within said casing spaced from the sides thereof, said rail having an upper portion, a follower disposed upon said rail provided with an opening within its upper portion, a slidably movable cover overlying said casing provided with a pair of spaced arcuate recesses on the underside thereof and being disposable within said cover retaining slots, a handle upon said cover, a pair of spaced spring support members upon the underside of said cover disposed within said arcuate recesses, a coil spring disposed upon each of said spring support members, a follower actuating member disposed between said spring members and engageable therewith, said follower actuating member having a downwardly depending projection disposable within the opening within said follower, a cut-out portion at the rear of said rail, a movable springable latching member upon said cover having a downwardly depending projection engageable with said cut-out portion at the rear of said rail so that said cover can be disengaged to permit loading said magazine.

9. A magazine for a fastening device comprising a casing, fastener support means and a follower within said casing, a cover overlying said casing and slidably movable therealong, said cover being provided with a spaced pair of arcuate recesses on the underside thereof, a spring support member secured to said cover on the underside thereof and within each of said arcuate recesses, a substantially linear coil spring member disposed upon each of said spring support members, said spring members being also engageable with said follower.

10. A magazine for a fastening device comprising a casing, fastener support means and a follower within said casing, a cover overlying said casing and longitudinally and slidably movable therealong, said cover being provided with a longitudinally disposed spaced pair of arcuate recesses on the underside thereof, a spring support rod secured to said cover on the underside thereof and lying within each of said arcuate recesses, a substantially linear coil spring member disposed upon each of said spring support members, said spring members being engageable with said follower.

11. A magazine for a fastening device comprising a casing, a longitudinally disposed rail and a follower within said casing, a cover overlying said casing and longitudinally and slidably movable therealong, said cover being provided with a transversely spaced pair of longitudinally disposed arcuate recesses on the underside thereof, a spring support rod secured to said cover on the underside thereof, a spring support rod lying within each of said arcuate recesses, a substantially linear coil spring member normally in expanded relationship disposed upon each of said spring support members, said springs being engageable with said follower.

References Cited in the file of this patent

UNITED STATES PATENTS

| | | |
|---|---|---|
| 15,397 | Westerhood | July 22, 1856 |
| 978,415 | Wesson | Dec. 13, 1910 |
| 2,590,858 | Harvey | Apr. 1, 1952 |
| 2,746,043 | Heller | May 22, 1956 |
| 2,750,700 | Harvey | June 19, 1956 |
| 2,918,675 | Smith | Dec. 29, 1959 |
| 2,931,038 | Wandel | Apr. 5, 1960 |